United States Patent
Kakeya et al.

(10) Patent No.: US 9,716,271 B2
(45) Date of Patent: Jul. 25, 2017

(54) NICKEL HYDROXIDE FOR ALKALINE SECONDARY BATTERY AND ALKALINE SECONDARY BATTERY

(71) Applicant: GS Yuasa International Ltd., Kyoto-shi, Kyoto (JP)

(72) Inventors: Tadashi Kakeya, Kyoto (JP); Manabu Kanemoto, Kyoto (JP); Hideto Watanabe, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 138 days.

(21) Appl. No.: 14/644,311

(22) Filed: Mar. 11, 2015

(65) Prior Publication Data
US 2015/0263346 A1 Sep. 17, 2015

(30) Foreign Application Priority Data

Mar. 12, 2014 (JP) .................................. 2014-048956
Mar. 12, 2014 (JP) .................................. 2014-048989

(51) Int. Cl.
*H01M 4/52* (2010.01)
*H01M 10/30* (2006.01)
*H01M 4/36* (2006.01)

(52) U.S. Cl.
CPC ............ *H01M 4/52* (2013.01); *H01M 4/364* (2013.01); *H01M 10/30* (2013.01)

(58) Field of Classification Search
None
See application file for complete search history.

(56) References Cited

U.S. PATENT DOCUMENTS

| 5,861,225 | A | 1/1999 | Ovshinsky | |
|---|---|---|---|---|
| 6,991,875 | B2 * | 1/2006 | Christian | H01M 4/244 29/623.1 |
| 7,081,319 | B2 * | 7/2006 | Christian | C01G 53/04 29/623.5 |
| 7,273,680 | B2 * | 9/2007 | Durkot | H01M 2/0272 429/206 |
| 2006/0159993 | A1 * | 7/2006 | Christian | C01G 53/04 429/223 |
| 2007/0248879 | A1 * | 10/2007 | Durkot | H01M 2/0272 429/130 |
| 2008/0038640 | A1 * | 2/2008 | Trainer | H01M 4/06 429/232 |
| 2015/0263346 | A1 * | 9/2015 | Kakeya | H01M 4/52 252/182.1 |

FOREIGN PATENT DOCUMENTS

| JP | 9161796 | A2 | 6/1997 |
|---|---|---|---|
| JP | 11509960 | T2 | 8/1999 |
| JP | 11307092 | A2 | 11/1999 |
| JP | 2001043855 | A2 | 2/2001 |
| JP | 2003187793 | A2 | 7/2003 |
| JP | 2003249214 | A2 | 9/2003 |

* cited by examiner

*Primary Examiner* — Joseph D Anthony
(74) *Attorney, Agent, or Firm* — Rankin, Hill & Clark LLP

(57) ABSTRACT

A nickel hydroxide for an alkaline secondary battery, wherein the nickel hydroxide contains α-nickel hydroxide particles and β-nickel hydroxide particles, and the ratio of the β-nickel hydroxide to the total amount of the nickel hydroxide is less than 75% by mass.

4 Claims, 2 Drawing Sheets

NICKEL HYDROXIDE FOR ALKALINE SECONDARY BATTERY AND ALKALINE SECONDARY BATTERY

CROSS-REFERENCE TO RELATED APPLICATIONS

This application claims the benefit of Japanese patent applications No. 2014-048956, filed on Mar. 12, 2014, and No. 2014-048989, filed on Mar. 12, 2014, which are incorporated by reference.

FIELD

The present invention relates to a nickel hydroxide for an alkaline secondary battery, and an alkaline secondary battery using the nickel hydroxide.

BACKGROUND

A nickel hydroxide is used for a nickel electrode of an alkaline secondary battery. Nickel hydroxides include an α type and a β type, and the nickel hydroxide for an alkaline secondary battery widely used at present is β-nickel hydroxide. An oxidation-reduction reaction at the time of charge-discharge of an active material of the nickel electrode is a "one-electron reaction" in which the oxidation number of nickel varies from +2 to +3.

On the other hand, in recent years, an increase in capacity is required of the nickel electrode, and it is proposed to use α-nickel hydroxide as an active material. While the reaction of the β-nickel hydroxide is a one-electron reaction, a multi-electron reaction takes place in the α-nickel hydroxide, and therefore the α-nickel hydroxide enables to outstandingly improve the capacity per nickel weight.

However, when the α-nickel hydroxide is used for the electrode, there is a disadvantage that initial activation of the battery is hardly achieved. In general, in the alkaline secondary battery using a nickel hydroxide electrode, activation of the nickel hydroxide is achieved to a degree suitable for charge-discharge by repeating charge-discharge cycles several times to about ten times before completion of the battery. When the activation of the nickel hydroxide is hard, there is a possibility that not only the number of activation steps in the production process of the alkaline secondary battery is increased, but also a damage or capacity deterioration of the battery occurs.

In order to solve these problems, an effort to constitute a nickel electrode by adding a hydroxide of erbium or thulium, or an oxyhydroxide to the α-nickel hydroxide has been made (JP-A-2003-249214). However, in such a case, an additive not involved in charge-discharge is used in the electrode, and the ratio of the active material in the electrode decreases, and therefore, the substantial discharge capacity is reduced.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to solve the disadvantage that initial activation of the α-nickel hydroxide is hardly achieved when the α-nickel hydroxide is used as an active material.

In accordance with the present invention, at least a nickel hydroxide having the following aspects and an alkaline secondary battery including the nickel hydroxide are provided.

[1]
A nickel hydroxide, wherein the nickel hydroxide contains α-nickel hydroxide particles and β-nickel hydroxide particles, and the ratio of the β-nickel hydroxide to the total amount of the nickel hydroxide is less than 75% by mass.

[2]
The nickel hydroxide according to the above item [1], wherein the ratio of the β-nickel hydroxide to the total amount of the nickel hydroxide may be 50% by mass or less.

[3]
The nickel hydroxide according to the above item [1] or [2], wherein the average particle size of the β-nickel hydroxide particles may be smaller than that of the α-nickel hydroxide particles.

[4]
An alkaline secondary battery including the nickel hydroxide according to any one of the above items [1] to [3].

According to the aspects of the present invention, it is possible to obtain a nickel hydroxide for an alkaline secondary battery which can be easily activated initially even when α-nickel hydroxide is used, and an alkaline secondary battery using the nickel hydroxide.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

Figure 1A:
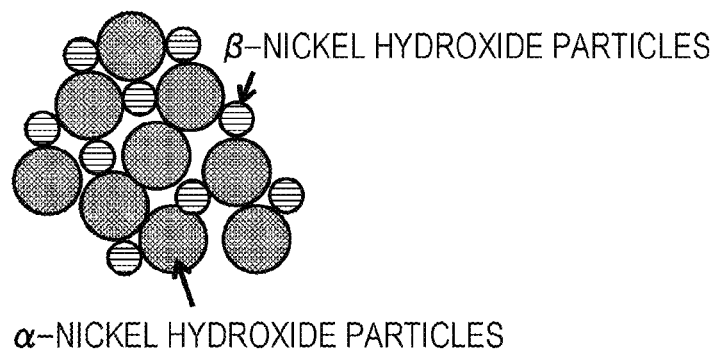
FIGS. 1A to 1C depict schematic views showing an aspect of α-nickel hydroxide particles.

Hereinafter, the present invention will be described in detail; however, the present invention is not limited to these.

<Alkaline Secondary Battery and Nickel Electrode>

An alkaline secondary battery of the present invention includes a nickel electrode serving as a positive electrode, which contains a mixed powder of α-nickel hydroxide particles and β-nickel hydroxide particles as an active material. Identification of α-nickel hydroxide particles and β-nickel hydroxide particles can be performed by measuring an X-ray diffraction peak. The nickel electrode may appropriately contain other materials as long as the effect of the present invention is not impaired.

The nickel electrode is composed of a current collector, and the nickel hydroxide of the present invention filled and arranged in the current collector. The current collector is not particularly limited as long as it is usable in the nickel electrode for an alkaline secondary battery. For example, a foamed nickel plate, a sintered body of fibrous nickel, or a holed steel plate plated with nickel can be used.

<Nickel Hydroxide (Active Material)>

In the present invention, the term "α-nickel hydroxide particles" means that the particles are principally composed of α-nickel hydroxide, but it does not intend to exclude an amorphous nickel hydroxide which is incidentally contained in the particles when the α-nickel hydroxide particles are synthesized according to the synthesis method of the present invention, β-nickel hydroxide, an additive metal element, or inevitable impurities. The α-nickel hydroxide is contained in the particles preferably in an amount of 50% by mass or more, more preferably 80% by mass or more. The higher the content rate of the α-nickel hydroxide in the particles is, it is more preferred since the theoretical value of the number of reaction electrons increases. Further, it is possible to confirm and quantify a state in which the α-nickel hydroxide and the f-nickel hydroxide are mixed in the particles of a nickel hydroxide by applying selected-area electron diffraction by a TEM (transmission electron microscope) to a particle, analyzing a diffraction spot image corresponding to a reciprocal lattice point appearing on a focal plane, and calculating crystal parameters such as the spacing and plane direction.

The α-nickel hydroxide is low in stability and hard to be produced alone, and therefore highly stable β-nickel hydroxide is produced. In order to avoid this, it is preferred to add a trivalent cation (Al, Ga, Mn, Fe, Mo, etc.) to the α-nickel hydroxide. Among these elements, the effect of adding Al is remarkable. It is assumed that these elements are substituted for a part of nickel atoms in the nickel hydroxide, or are solid solved between nickel hydroxide layers to stabilize the crystal structure of the α-nickel hydroxide. The contents of these elements in the nickel hydroxide can be measured by a well-known method such as ICP analysis.

As described above, when trying to stably produce the α-nickel hydroxide, all of the nickel hydroxide particles can be stably formed into α-nickel hydroxide if the content rate of the trivalent cation is set to 20 mol %. On the other hand, when the content rate of the trivalent cation is set to 0 mol %, the α-nickel hydroxide cannot be stably produced in the nickel hydroxide particles, and the β-nickel hydroxide is stably produced. A relationship between the content rate of the trivalent cation and the production amount of the α-nickel hydroxide is linear. When the content rate of the trivalent cation is 10 mol %, the α-nickel hydroxide is produced in an amount of 50% by mass and the β-nickel hydroxide is produced in an amount of 50% by mass. In addition, the maximum value of the concentration at which the trivalent cation is present in the α-nickel hydroxide is 20 mol %, and even if the content rate of the trivalent cation is increased more, no remarkable effect on improvement in the stability of the α-nickel hydroxide is achieved. From the viewpoint of stably producing the α-nickel hydroxide and increasing the theoretical value of the number of reaction electrons of nickel, the content rate of the trivalent cation is preferably set to 10 to 20 mol %.

In the present invention, the term "β-nickel hydroxide" particles means that the particles are principally composed of β-nickel hydroxide, but it does not intend to exclude an amorphous nickel hydroxide which is incidentally contained in the particles when the β-nickel hydroxide is synthesized according to the synthesis method of the present invention, α-nickel hydroxide, an additive metal element, or inevitable impurities. In addition, the β-nickel hydroxide is contained in the particles preferably in an amount of 50% by mass or more, more preferably 80% by mass or more. The higher the content rate of the β-nickel hydroxide in the particles is, it is more preferred since initial activation of the alkaline secondary battery becomes easier.

In addition, since quantification of the β-nickel hydroxide in the nickel hydroxide particles is the same as that in the above description, its explanation will be omitted.

Figure 1B:
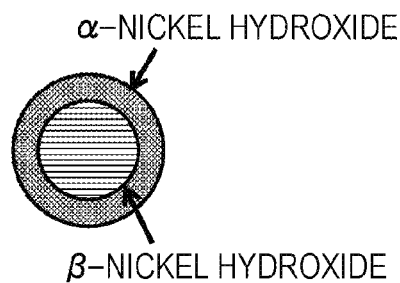
Figure 1C:
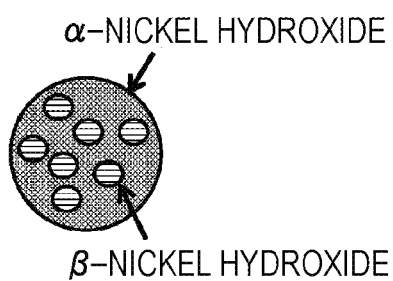

In the present invention, the phrase "(a substance) containing α-nickel hydroxide particles and β-nickel hydroxide particles" refers to a mixed powder obtained by mixing the α-nickel hydroxide particles with the β-nickel hydroxide particles. That is, the mixed powder corresponds to the case in which the α-nickel hydroxide particles and the β-nickel hydroxide particles independently exist as shown in FIG. 1, and these particles are mixed (FIG. 1A), and does not mean the case where the mixed powder consists only of particles in which the α-nickel hydroxide and the β-nickel hydroxide are present in one particle (FIG. 1B and FIG. 1C). Here, FIG. 1B shows a particle formed by coating a β-nickel hydroxide particle with α-nickel hydroxide, and FIG. 1C shows a particle in a state of a mixed crystal of the α-nickel hydroxide and the β-nickel hydroxide.

Here, the α-nickel hydroxide particles and the β-nickel hydroxide particles respectively follow the above-mentioned definitions. As a mixing method, any technique commonly used can be used. On the other hand, for example, JP-A-2001-043855 discloses active material particles formed by coating base particles formed of β-nickel hydroxide with α-nickel hydroxide; however, this aspect of employing particles in which α-nickel hydroxide and β-nickel hydroxide are present in one particle does not fall within the mixed powder of the present invention. In the method described in JP-A-2001-043855, it is thought that precedent charging of the β-nickel hydroxide does not adequately proceed since the β-nickel hydroxide is coated with the α-nickel hydroxide, and therefore the effect of improving initial activity, which is an effect of the present invention, is not sufficient. Further, for example, JP-A-9-161797 discloses active material particles containing two kinds of active material fine particles having different compositions of additive elements added to a nickel hydroxide; however, the case of being configured only of an aspect in which α-nickel hydroxide fine particles and β-nickel hydroxide fine particles are present in an active material particle does not fall within the mixed powder of the present invention. In order to obtain active material particles containing a plurality of fine particles, it is necessary to perform a reaction of producing two fine particles in succession, and the production process becomes complicated.

The nickel hydroxide of the present invention includes α-nickel hydroxide and β-nickel hydroxide, and the ratio of the β-nickel hydroxide to the total amount of the nickel hydroxide is less than 75% by mass. From the viewpoint of increasing the theoretical value of the number of reaction electrons, the ratio of the β-nickel hydroxide to the total amount of the nickel hydroxide is preferably 50% by mass or less, and more preferably 20% by mass or less. When the ratio of the β-nickel hydroxide to the total amount of the nickel hydroxide is more than 50% by mass, an effect of improving initial activity based on the existence of the β-nickel hydroxide particles is found, but an effect of increasing the theoretical value of the number of reaction electrons based on the existence of the α-nickel hydroxide particles is small. Further, when the β-nickel hydroxide particles do not exist, the theoretical value of the number of reaction electrons is maximized, but the effect of improving initial activity is not found.

In the present invention, the mass ratio between the α-nickel hydroxide and the β-nickel hydroxide can be quantified by measuring the X-ray diffraction peak of a mixed powder of these nickel hydroxides. That is, the mass ratio can be obtained by comparing the intensity between a (003) diffraction peak of the α-phase at a diffraction angle 2θ of 10° to 12°, which is the maximum peak in the α-nickel hydroxide, and a (001) diffraction peak of the β-phase at a diffraction angle 2θ of 18° to 22°, which is the maximum peak in the β-nickel hydroxide, and calculating the ratio between them as the mass ratio.

Further, in addition to this, when the α-nickel hydroxide contains the trivalent cation, it is also possible to calculate the mass ratio between the α-nickel hydroxide and the β-nickel hydroxide from the amount of the cation by quantifying the amount by use of ICP or the like.

The α-nickel hydroxide of the present invention is powdery, and the average particle size thereof is preferably set to 5 to 20 μm, and more preferably 7 to 15 μm. Further, the β-nickel hydroxide of the present invention is similarly powdery, and the average particle size thereof is preferably set to 3 to 15 μm, and more preferably 5 to 13 μm. As described above, since the improvement in initial activity which is the effect of the present invention results from the fact that the β-nickel hydroxide previously charged serves as a conducting agent, the β-nickel hydroxide particles preferably have as many contacts as possible with the α-nickel hydroxide particles or other β-nickel hydroxide particles. From this viewpoint, in order to increase the specific surface area of the β-nickel hydroxide particles, the average particle size of particles composed of the β-nickel hydroxide is preferably smaller than the average particle size of particles composed only of the α-nickel hydroxide. Here, the average particle size in the present invention refers to a particle size at which the cumulative percentage of particles reaches 50% in the cumulative distribution of the particle size.

<Negative Electrode>

A hydrogen storage alloy electrode, a cadmium electrode, a zinc electrode or the like can be used for the negative electrode of the alkaline secondary battery according to the present invention. For example, as the hydrogen storage alloy electrode, an alloy having a composition of $Mm_{1.0}Ni_{4.0}Co_{0.7}Al_{0.3}Mn_{0.3}$ can be used. Herein, Mm means a misch metal [lanthanum (La), cerium (Ce), praseodymium (Pr), neodymium (Nd), etc.] which is a mixture of rare earth elements. The present invention is not limited to use of such a hydrogen storage alloy electrode, and any negative electrode can be appropriately used. For example, alloys of a multi-element system obtained by substituting a part of Ni of an MmNi5 alloy with an element such as Al, Mn, Co, Ti, Cu or Zn, alloys of a TiNi system, or alloys of a TiFe system can be applied.

<Separator>

As the separator to be used in the present invention, for example, a non-woven fabric made of a polypropylene (PP) fiber, to which hydrophilicity is imparted by graft polymerization of acrylic acid, can be used. However, the present invention is not limited to this, and any separator can be appropriately used. For example, a non-woven fabric of a polyolefin fiber including a polypropylene or a polyamide fiber, or these fibers provided with a hydrophilic functional group such as a sulfone group, can be used.

<Electrolyte Solution>

The composition of the electrolyte solution is also not particularly limited. In addition to an aqueous potassium hydroxide solution commonly used, an aqueous solution containing one of sodium hydroxide and lithium hydroxide or containing at least two of these three hydroxides can be used.

<Synthesis of α-Nickel Hydroxide Particles>

A mixed aqueous solution of a hydrate of $NiSO_4$ and a hydrate of $Al_2(SO_4)_3$ is prepared. In this case, the total concentration of the $Ni^{2+}$ ion concentration and the $Al^{3+}$ ion concentration is preferably set to 0.5 to 2.5 mol/L, more preferably 1.0 to 2.0 mol/L.

Then, while stirring the mixed aqueous solution, it is added dropwise to an alkaline aqueous solution of 20 to 80° C., preferably 40 to 60° C. to coprecipitate $Ni(OH)_2$ and $Al(OH)_3$, and the resulting precipitate is separated by filtration, washed, and dried to obtain α-nickel hydroxide. As the alkaline aqueous solution, a mixture of sodium hydroxide and an ammonium ion is preferred. Since nearly all of Ni and Al are precipitated by this reaction, the contents of nickel and aluminum in the nickel electrode can be controlled by the ratio between the amounts of charge of $NiSO_4$ and $Al_2(SO_4)_3$. In order to increase the tap density (volume density after applying tapping) of the nickel electrode, the pH of the alkaline aqueous solution is preferably set to 10 to 12, and particularly preferably to 10.5 to 11.5.

In the above synthesis method, $NiSO_4$ can be changed to any water-soluble nickel salt, and $Al_2(SO_4)_3$ can be changed to any water-soluble aluminum salt.

Further, the $Ni^{2+}$ ion may be converted to a nickel ammine complex by mixing an aqueous solution containing $(NH4)^+$ ions in a mixed aqueous solution of $NiSO_4$ and $Al_2(SO_4)_3$ before coprecipitating $Ni(OH)_2$ and $Al(OH)_3$.

<Synthesis of β-Nickel Hydroxide Particles>

An aqueous solution of a hydrate of $NiSO_4$ is prepared. In this case, the $Ni^{2+}$ ion concentration is preferably set to 1.0 to 2.0 mol/L. While stirring the aqueous solution, it is added dropwise to an alkaline aqueous solution of 20 to 80° C., preferably 40 to 60° C. to precipitate $Ni(OH)_2$, and the resulting precipitate is separated by filtration, washed, and dried to obtain β-nickel hydroxide. In order to increase the tap density (volume density after applying tapping) of the nickel electrode, the pH of the alkaline aqueous solution is preferably set to 10 or more, and particularly preferably to 11 to 13. $NiSO_4$ can be changed to any water-soluble nickel salt.

Further, the $Ni^{2+}$ ion may be converted to an ammine complex by mixing an aqueous solution containing ammonium ions in an aqueous nickel solution before precipitating $Ni(OH)_2$.

<Preparation of Nickel Electrode Containing Mixed Powder of α-Nickel Hydroxide Particles and β-Nickel Hydroxide Particles as Active Material>

The α-nickel hydroxide particles and the β-nickel hydroxide particles respectively synthesized were mixed with a binder and water to prepare a paste. As the binder, any well-known binder such as polytetrafluoroethylene (PTFE) can be used. The mixed powder of the present invention can be prepared by applying the mixed paste to a current collector and drying the paste.

Further, in order to enhance the conductive property of an electrode to be prepared, any conducting additive may be added together. Examples of the conducting additive include compounds of cobalt, particularly preferably a cobalt hydroxide. When a hydroxide of cobalt is added by a powder mixing method, it is preferred to perform a step of coating the surface of nickel hydroxide particles with a hydroxide of cobalt by dissolution in and reprecipitation from the electrolyte solution, and a step of oxidizing the hydroxide of cobalt to an oxyhydroxide of cobalt or the like. Practically, as described in WO 2006/064979 A, it is preferred to coat the surface of nickel hydroxide particles with a cobalt hydroxide in advance, and oxidize the cobalt to cobalt oxyhydroxide.

Moreover, the paste may contain any additive as long as the performance of the active material is not impaired.

By varying the mixing ratio between the α-nickel hydroxide particles and the β-nickel hydroxide particles in preparing the paste, a nickel electrode containing particles different in the content ratio can be prepared. A method of applying the prepared paste to the current collector to prepare a nickel electrode into which the active material is filled and arranged is not particularly limited, and any method which is known to those skilled in the art can be used. Further, execution of a drying step and a pressing step after application of the paste are not particularly limited.

<Preparation of Battery>

A method of preparing an alkaline secondary battery by using the prepared nickel electrode is not particularly limited, and any method which is known to those skilled in the art can be used.

Examples

Hereinafter, the present invention will be further described by way of examples.

<Synthesis of α-Nickel Hydroxide Particles>

A mixed aqueous solution of a hydrate of $NiSO_4$ and a hydrate of $Al_2(SO_4)_3$ was prepared and adjusted so that the total concentration of the $Ni^{2+}$ ion concentration and the $Al^{3+}$ ion concentration was 1 mol/L. The mixed aqueous solution was added dropwise to an alkaline aqueous solution of 50° C. having a pH of 11 (pH was adjusted to 11 with an aqueous NaOH solution) under vigorous stirring to coprecipitate Ni and Al. Thereafter, the resulting precipitate was filtered/washed, and the resulting filtration residue was dried at 80° C. for 16 hours to obtain α-nickel hydroxide having an average particle size of 10.8 μm.

From X-ray diffraction (MiniFlex2 manufactured by Rigaku Corporation, Cu-Kα radiation used, tube current 15 mA, acceleration voltage 30 kV, range of measurement angle 5° to 85°, sweep speed 4° $min^{-1}$), a (003) diffraction peak of the α-phase was found at a diffraction angle 2θ of 10° to 12° to confirm that α-nickel hydroxide was obtained. The average particle size of the α-nickel hydroxide particles was determined by measuring the cumulative distribution of the particle size and calculating measurements using a laser diffraction/scattering type particle size distribution analyzer (MT3000 manufactured by Microtrack Inc.).

Further, by varying the ratio between the $Ni^{2+}$ ion and the $Al^{3+}$ ion in the mixed aqueous solution of a hydrate of $NiSO_4$ and a hydrate of $Al_2(SO_4)_3$, a nickel hydroxide having an Al content of 10 mol % and a nickel hydroxide having an Al content of 20 mol % were prepared.

<Synthesis of β-Nickel Hydroxide Particles>

An aqueous solution of a hydrate of $NiSO_4$ was prepared so that the $Ni^{2+}$ ion concentration was 1 mol/L. The aqueous solution was added dropwise to an alkaline aqueous solution of 50° C. having a pH of 11 (pH was adjusted to 11 with an aqueous NaOH solution) under vigorous stirring to precipitate Ni. Thereafter, the resulting precipitate was filtered/washed, and the resulting filtration residue was dried at 80° C. for 16 hours to obtain β-nickel hydroxide having an average particle size of 9.8 μm.

From X-ray diffraction (MiniFlex2 manufactured by Rigaku Corporation, Cu-Kα radiation used, tube current 15 mA, acceleration voltage 30 kV, range of measurement angle 5° to 85°, sweep speed 4° $min^{-1}$), a (001) diffraction peak of the 1-phase was found at a diffraction angle 2θ of 18° to 22° to confirm that β-nickel hydroxide was obtained.

The average particle size of the β-nickel hydroxide particles was determined by measuring the cumulative distribution of the particle size and calculating measurements using a laser diffraction/scattering type particle size distribution analyzer (MT3000 manufactured by Microtrack Inc.).

<Preparation of Nickel Electrode>

To the obtained nickel hydroxide, 10% by weight of a cobalt hydroxide was added as a conducting additive. In this, an aqueous carboxymethyl cellulose (CMC) solution having a concentration of 1% by mass and PTFE were mixed to form a nickel electrode paste. The solids in the nickel electrode paste are composed of nickel hydroxide (mixture of α-nickel hydroxide particles and β-nickel hydroxide particles), α-$Co(OH)_2$, and PTFE+CMC in proportions of 89.5:10:0.5. A plurality of pastes were prepared in a state in which the amounts of α-$Co(OH)_2$ and PTFE+CMC were kept constant unless otherwise specified, and the mixing ratio between the α-nickel hydroxide particles and the β-nickel hydroxide particles was varied stepwise so as to be the values shown in Table 1.

The nickel electrode paste was filled into a foamed nickel substrate having a thickness of 1.4 mm and a density per area of 320 $g/m^2$ so that the electrode capacity was 250 mAh, and dried, and then the nickel substrate was subjected to roll forming to form a base plate of a nickel electrode having a thickness of 0.4 mm. The base plate was cut into pieces of 40 mm×60 mm to obtain a plurality of nickel electrodes (positive electrodes) for an alkaline secondary battery, which contain different amounts of the β-nickel hydroxide particles.

<Preparation of Hydrogen Storage Alloy Electrode>

Raw materials were mixed in such a way that the composition became $Mm_{1.0}Ni_{4.0}Co_{0.7}Al_{0.3}Mn_{0.3}$ (Mm is a misch metal), and an alloy ingot was prepared by high-frequency induction heating in an inert atmosphere. The alloy ingot was heat treated at 1000° C. for 7 hours, and pulverized into particles having an average particle size of 50 μm to prepare a hydrogen storage alloy powder. This powder was mixed with a dispersion of styrene-butadiene rubber (SBR) and an aqueous methyl cellulose (MC) solution to form a hydrogen storage alloy paste. The paste was applied to a substrate formed by plating a Fe substrate of 45 μm in thickness with nickel of 1 μm in thickness, and dried to obtain a base plate. The base plate was cut into pieces of 45 mm×65 mm to prepare hydrogen storage alloy electrodes (negative electrodes) having an electrode capacity of 500 mAh or more.

<Preparation of Evaluation Cell>

A separator made of a synthetic resin was arranged on both surfaces of each of the prepared nickel electrodes, and the nickel electrode including the separator was sandwiched between two sheets of hydrogen storage alloy electrodes and set in a container. Further, Hg/HgO electrodes were provided as reference electrodes. A 6.8 mol/L alkaline electrolyte solution including potassium hydroxide (KOH) was poured in the container to such an extent that the electrode was adequately immersed to prepare an open type cell. It is assumed that α-Co(OH)$_2$ particles in the nickel electrode undergo dissolution in the electrolyte solution and are reprecipitated on the surface of the nickel hydroxide having aluminum solid-solved during charge-discharge.

mAh/g for both of α-nickel hydroxide and β-nickel hydroxide) is developed. Further, in Table 1, the term "α-phase" refers to α-nickel hydroxide, and the term "β-phase" refers to β-nickel hydroxide. Moreover, the theoretical value of the number of reaction electrons in Table 1 is a theoretical value calculated from the existence ratio (mass ratio) between the α-nickel hydroxide and the β-nickel hydroxide, taking the numbers of reaction electrons of the α-nickel hydroxide and the β-nickel hydroxide as 1.31 and 1.00 respectively.

TABLE 1

| | Mixing ratio between particles/mass % | | Al content in α-phase particle/mol % | Existence ratio between α-phase and β-phase/mass % | | Number of cycles required for activation/cycle | Number of reaction electrons* |
|---|---|---|---|---|---|---|---|
| | α-phase particle | β-phase particle | | α-phase | β-phase | | |
| Comparative Example 1 | 0 | 100 | 20 | 0 | 100 | 2 | 1.00 |
| Comparative Example 2 | 20 | 80 | 20 | 20 | 80 | 4 | 1.06 |
| Comparative Example 3 | 50 | 50 | 10 | 25 | 75 | 4 | 1.16 |
| Example 1 | 40 | 60 | 20 | 40 | 60 | 4 | 1.13 |
| Example 2 | 50 | 50 | 20 | 50 | 50 | 4 | 1.16 |
| Example 3 | 60 | 40 | 20 | 60 | 40 | 4 | 1.19 |
| Example 4 | 80 | 20 | 20 | 80 | 20 | 5 | 1.25 |
| Example 5 | 90 | 10 | 20 | 90 | 10 | 6 | 1.28 |
| Comparative Example 4 | 100 | 0 | 10 | 50 | 50 | 6 | 1.24 |
| Comparative Example 5 | 100 | 0 | 20 | 100 | 0 | 10 | 1.31 |

*The number of reaction electrons is a theoretical value determined by calculation.

The cell was initially charged at a current of 0.1 ItA (25 mA) for 15 hours. Herein, "ItA" represents the magnitude of the charge-discharge current of a secondary battery, and is denoted by a factor of a numeral value representing the rated capacity of a battery, It and the unit of current. It is assumed that the α-Co(OH)$_2$ particles were oxidized to an oxyhydroxide of Co during initial charging. After initial charging, the cell was paused for 1 hour, and discharged at a current of 0.2 ItA (50 mA) until the positive electrode potential became equal to the potential of the reference electrode. The charge-discharge cycles were repeated ten times.

<Measurement of Existence Ratio Between α-Nickel Hydroxide and β-Nickel Hydroxide>

Each nickel electrode was taken out of the evaluation cell after the charge-discharge cycles, washed with distilled water, and vacuum-dried at room temperature for 10 hours. The substrate was removed from the dried nickel electrode, and the resulting powder was subjected to X-ray diffraction (MiniFlex2 manufactured by Rigaku Corporation, Cu-Kα radiation used, tube current 15 mA, acceleration voltage 30 kV, range of measurement angle 5° to 85°, sweep speed 4°/min$^{-1}$) to determine the existence ratio between the α-nickel hydroxide and the β-nickel hydroxide.

Figure 2:
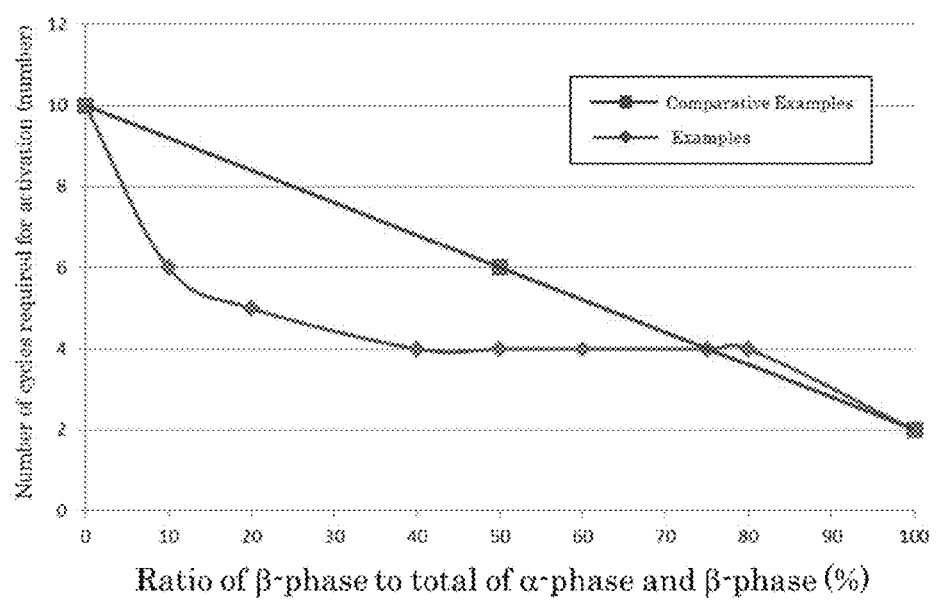
FIG. 2 depicts a graph showing a comparison between the ratio of β-nickel hydroxide contained in the nickel hydroxide and the number of cycles required for activation.

The measurement results of the existence ratio between the α-nickel hydroxide and the β-nickel hydroxide, and the measurement results of the discharge capacity per unit active material in the above charge-discharge test are shown in Table 1 and FIG. 2. The term "activation" in Table 1 means a state where 95% or more of the maximum capacity (260

As is apparent from Table 1 and FIG. 2, when the nickel electrode contained the β-nickel hydroxide particles, the number of cycles required for activation was significantly reduced from 10 in the case where the electrode did not contain the β-nickel hydroxide particles to 5, and therefore an effect of improving initial activity by mixing the β-nickel hydroxide particles is clearly found. Further, since the nickel electrode contains the α-nickel hydroxide, it becomes possible to increase the theoretical value of the number of reaction electrons compared with the case where the nickel electrode is composed only of the β-nickel hydroxide.

What is claimed is:

1. A nickel hydroxide, wherein
   the nickel hydroxide contains α-nickel hydroxide particles and β-nickel hydroxide particles, the α-nickel hydroxide particles and the β-nickel hydroxide particles independently existing in the nickel hydroxide,
   the ratio of the β-nickel hydroxide to the total amount of the nickel hydroxide is less than 75% by mass, and
   the average particle size of the β-nickel hydroxide particles is smaller than that of the α-nickel hydroxide particles.

2. The nickel hydroxide according to claim 1, wherein the ratio of the β-nickel hydroxide to the total amount of the nickel hydroxide is 50% by mass or less.

3. An alkaline secondary battery comprising the nickel hydroxide according to claim 1.

4. A nickel hydroxide, wherein
   the nickel hydroxide contains α-nickel hydroxide particles and β-nickel hydroxide particles, the α-nickel hydroxide particles and the β-nickel hydroxide particles independently existing in the nickel hydroxide, the average particle size of the β-nickel hydroxide particles is smaller than that of the α-nickel hydroxide particles, and the α-nickel hydroxide particles are contained at an amount of 50% by mass or more in the α-nickel hydroxide particles and β-nickel hydroxide particles.

* * * * *